United States Patent
Kishore et al.

(10) Patent No.: US 7,284,076 B2
(45) Date of Patent: Oct. 16, 2007

(54) DYNAMICALLY SHARED MEMORY

(75) Inventors: Karagada Ramarao Kishore, Saratoga, CA (US); Chien-Hsien Wu, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 439 days.

(21) Appl. No.: 10/819,979

(22) Filed: Apr. 8, 2004

(65) Prior Publication Data

US 2005/0078695 A1 Apr. 14, 2005

Related U.S. Application Data

(60) Provisional application No. 60/529,619, filed on Dec. 16, 2003, provisional application No. 60/483,023, filed on Jun. 27, 2003.

(51) Int. Cl.
*G06F 5/00* (2006.01)
*G06F 13/00* (2006.01)

(52) U.S. Cl. .................. 710/52; 710/310; 709/213; 370/413

(58) Field of Classification Search ............ 710/52–57; 370/412, 401, 413, 428; 709/213
See application file for complete search history.

(56) References Cited

U.S. PATENT DOCUMENTS

| | | | | |
|---|---|---|---|---|
| 5,640,604 A | * | 6/1997 | Hirano ......................... | 710/56 |
| 5,862,409 A | * | 1/1999 | Yoshimoto et al. ........... | 710/57 |
| 5,907,717 A | * | 5/1999 | Ellis ............................. | 710/56 |
| 5,913,074 A | * | 6/1999 | Ikeda et al. ................... | 710/29 |
| 6,219,728 B1 | * | 4/2001 | Yin .............................. | 710/52 |
| 7,003,597 B2 | * | 2/2006 | Georgiou et al. ............. | 710/56 |
| 2003/0177293 A1 | * | 9/2003 | Bilak et al. .................... | 710/56 |

* cited by examiner

*Primary Examiner*—Christopher Shin
(74) *Attorney, Agent, or Firm*—Squire, Sanders & Dempsey, L.L.P.

(57) ABSTRACT

A method and a system for allocating memory in a memory buffer that is part of a data distribution device. Generally, the allocation of memory is for the purpose of storing datagrams. The method allocates memory in the buffer based, at least partially, on how ingress ports that are operably connected to the memory buffer have previously used the buffer to store datagrams. The system typically includes one or more detectors that monitor how various ingresses into the data distribution device are using and have used the memory buffer.

22 Claims, 13 Drawing Sheets

DYNAMICALLY SHARED MEMORY

CROSS REFERENCE TO RELATED APPLICATIONS

This Specification claims priority from U.S. Provisional Patent Application Ser. No. 60/483,023, entitled "Dynamically Shared Memory in BCM 5695" and filed on Jun. 27, 2003, and U.S. Provisional Patent Application Ser. No. 60/529,619, entitled "Dynamically Shared Memory" and filed on Dec. 16, 2003. The contents of the above-referenced Provisional Patent Applications are hereby incorporated in their entirety by reference.

BACKGROUND OF THE INVENTION

1. Field of the Invention

Certain embodiments of the present invention are directed generally to methods for sharing a memory buffer in a data distribution device. Certain other embodiments of the present invention are generally directed to data distribution devices for implementing such methods.

2. Description of the Related Art

Generally, data distribution devices according to the related art, such as, for example, routers and shared memory switches, have one pool of data memory and many pointers that reference that pool. As shown in FIG. 1, a pool of data memory according to the related art may include a cell pool buffer 100. The cell pool buffer 100 typically is accessed by ports of the data distribution device that includes the buffer 100, as illustrated in FIG. 1 by the references to representative ports P0, P1 ... P9 ... PN, each of which are operably connected to portions of the buffer 100.

According to the related art, each port P0, P1 ... P9 ... PN acts as an ingress and/or egress for data packets in one or more Classes of Service (COSs). As shown in FIG. 1, the cell pool buffer 100 has regions thereof allocated to several COSs for each of the ports.

According to the buffer 100 illustrated in FIG. 1, each port has a buffer region 130, 140, 150, 160 allocated/dedicated exclusively to it. Each allocated buffer region 130, 140, 150, 160 is of a set size and includes a statically-allocated number of memory cells. Each region 130, 140, 150, 160 includes a low-water mark (LWM) 110 and a high-water mark (HWM) 120. The LWM 110 sets a minimum level of cells or buffer allocation for each of the COSs supported by a given port. The HWM 120 sets a maximum level of cell or buffer allocation for each of the ports.

Typically, when in use, a data distribution device that includes the buffer 100 illustrated in FIG. 1 makes use of the buffer 100 when some of the ports P0, P1 ... P9 ... PN in the device are communicating with other ports, usually on other devices in a network. For example, the buffer 100 may be used when the port P1 in FIG. 1 is exchanging data packets with one or more ports on other devices in the network to which the port P1 is operably connected.

If only two ports in a network are communicating, and if each of these ports has the same capacity/bandwidth available for exchanging data packets or, more generally, datagrams (which may include, for example, cells, bit strings, and packets), only a minimum fixed amount of the cell pool buffer 100 will typically be used. Rather, under such circumstances, packets received by the ingress port will be able to "flow through" the ingress port and will be distributed through egress ports without having to be stored in memory for an extended period of time. However, if one of the ports that is operably connected to the cell pool buffer 100 begins communicating with two or more other ports simultaneously, or if the bandwidth of a receiving (ingress) port is higher than the bandwidth of a transmitting port, a problem of over-subscription may occur at the egress port.

When an egress port is over-subscribed, more data packets attempt to flow through the egress port than the port can handle. Hence, the packets are usually either stored in the buffer 100 or dropped/discarded. In a preferable data distribution device such as, for example, a router or switch, the over-subscription is only a temporary situation. Therefore, under preferable conditions, the cell pool buffer 100 is large enough to be capable of storing packets that cannot be immediately distributed through an egress port. Under these preferable conditions, the packets are stored until an egress port becomes available for these packets.

In other words, under preferable conditions, when an egress port in a data distribution device is over-subscribed, packets are stored temporarily in the buffer 100. Then, when the burst of packet traffic that caused the over-subscription goes away, the packets stored in the buffer 100 are drained from the buffer 100 and are distributed to egress ports. This allows for continuous operation of the data distribution device without loss of packets.

When, as shown in FIG. 1, the ports P0, P1 ... P9 ... PN of a data distribution device have each been operably connected and assigned to a statically-allocated buffer region 130, 140, 150, 160, each port has access to only a certain amount of the memory in the buffer 100. Hence, when the port P1 of the switch becomes over-subscribed, the port P1 may store excess packets in the first statically-allocated buffer region 140, up to the HWM 120. However, if packets attempting to use port P1 as an egress fill up the entire first statically-allocated buffer region 140, continued over-subscription of the port P1 results in dropping/discarding/loss of incoming packets, even though regions 130, 140, 150, 160, etc. are available. As one skilled in the art will appreciate, this is an undesirable condition.

FIG. 2 illustrates a second cell pool buffer 200 according to the related art. This second cell pool buffer 200 alleviates some of the problem of the first cell pool buffer 100 illustrated in FIG. 1.

The second cell pool buffer 200 contains a set of five representative ports P0, P1, P2, P3, P4 and, like the first cell pool buffer 100 illustrated in FIG. 1, has an LWM 210. In order to simplify comparisons between the FIG. 1 and FIG. 2, dashed vertical lines are included to show where the statically-allocated buffer regions 130, 140, 150, 160 illustrated in FIG. 1 would be positioned in the second cell pool buffer 200, had the second cell pool buffer 200 been divided similarly to the first cell pool buffer 100. It should be noted, however, that the vertical lines are provided only for the sake of comparison and that no statically-allocated buffer regions are included in the second cell pool buffer 200.

Unlike the first cell pool buffer 100, the second cell pool buffer 200 does not make use of an HWM for each of the ports operably connected thereto. Rather, when a port that is operably connected to the second cell pool buffer 200 needs to store a number of packets that would have exceeded the capacity of one of the statically-allocated buffer regions illustrated in FIG. 1, a port that is operably connected to the second buffer 200 illustrated in FIG. 2 is capable of storing packets in any buffer region that is available. In other words, if there is a region of the second cell pool buffer 200 above the LWM 210 that is not already storing a packet, any of the ports P0, P1, P2, P3, P4 operably connected to the second buffer 200 may store a packet in that region.

When the second cell pool buffer 200 is utilized as shown in FIG. 2, the port P3 does not store any packets in the regions above the LWM 210 and the port P2 uses only a small portion of what would have been its statically-allocated buffer region according to the first cell pool buffer 100. On the other hand, the port P0 slightly exceeds the capacity of what would have been its statically-allocated buffer region, and the port P4 greatly exceeds the capacity of what would have been its statically-allocated region. Therefore, in FIG. 2, all of the second buffer's 200 memory illustrated above the LWM 210 is used.

In FIG. 2, the ports P0 and P4 have each been oversubscribed enough that packets would have been dropped if the first cell pool buffer 100 illustrated in FIG. 1 had been used. Of course, in FIG. 1, unused memory would have been present in statically-allocated buffer regions allocated to the ports P1, P2, and P3. Therefore, inefficient memory usage would have resulted.

Fortunately, using the second cell pool buffer 200 as shown if FIG. 2, no packets are lost and efficient use is made of all available memory. However, under the second cell pool buffer 200 distribution shown in FIG. 2, if any of the ports attempted to store additional packets, this would not be possible. Rather, because maximum capacity of the second cell pool buffer 200 has already been attained, the additional packets would be dropped, regardless of which port was attempting to store them.

At least in view of the above, it should be apparent that one of the problems associated with allocation of memory cells/space in the second cell pool buffer 200 illustrated in FIG. 2 is that any one port can "use up" a large amount of the second cell pool buffer 200, thereby depriving other ports the use of any cell pool buffer regions above the LWM 210. This situation becomes particularly problematic when a single port, such as a port that only slowly "drains" packets from memory cells to egress ports, frequently deprives the other ports of access to regions of the buffer 200. In such situations, the second cell pool buffer 200 allows unfair, long-term monopolization of the buffer 200 by one port, to the detriment of the other ports connected to the data distribution device containing the buffer 200.

At least in view of the above, there is a need for methods of allocating memory in a memory buffer, wherein the methods do not suffer from the shortcomings of the related art. In addition, there is a need for system for storing datagrams, wherein the systems are capable of implementing such methods.

SUMMARY OF THE INVENTION

According to certain embodiments of the present invention, a method of allocating memory in a data buffer is provided. The method typically includes the step of receiving a datagram from an ingress that is operably connected to the buffer. The method also generally includes the step of deciding whether to store the datagram in the buffer based at least partially upon prior use by the ingress or egress of the memory in the buffer.

According to certain other embodiments, a system for storing datagrams is provided. Usually, the system includes a memory buffer and an ingress that is operably connected to the buffer and configured to store datagrams in the memory buffer. Normally, the system also includes a first detector for detecting whether any memory is available to store a datagram in a first region of the memory buffer. Commonly, the first region includes a boundary that is dynamically set based on prior use of the buffer by the ingress. Also, typically, the first detector is operably connected to the buffer.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

In order to address at least the shortcomings of the related art systems and methods discussed above, certain embodiments of the present invention provide methods for allocating memory in a memory buffer. Certain other embodiments of the present invention also provide systems for storing datagrams. Representative embodiments of methods and systems according to certain embodiments of the present invention are illustrated in FIGS. 3-9.

Figure 1:
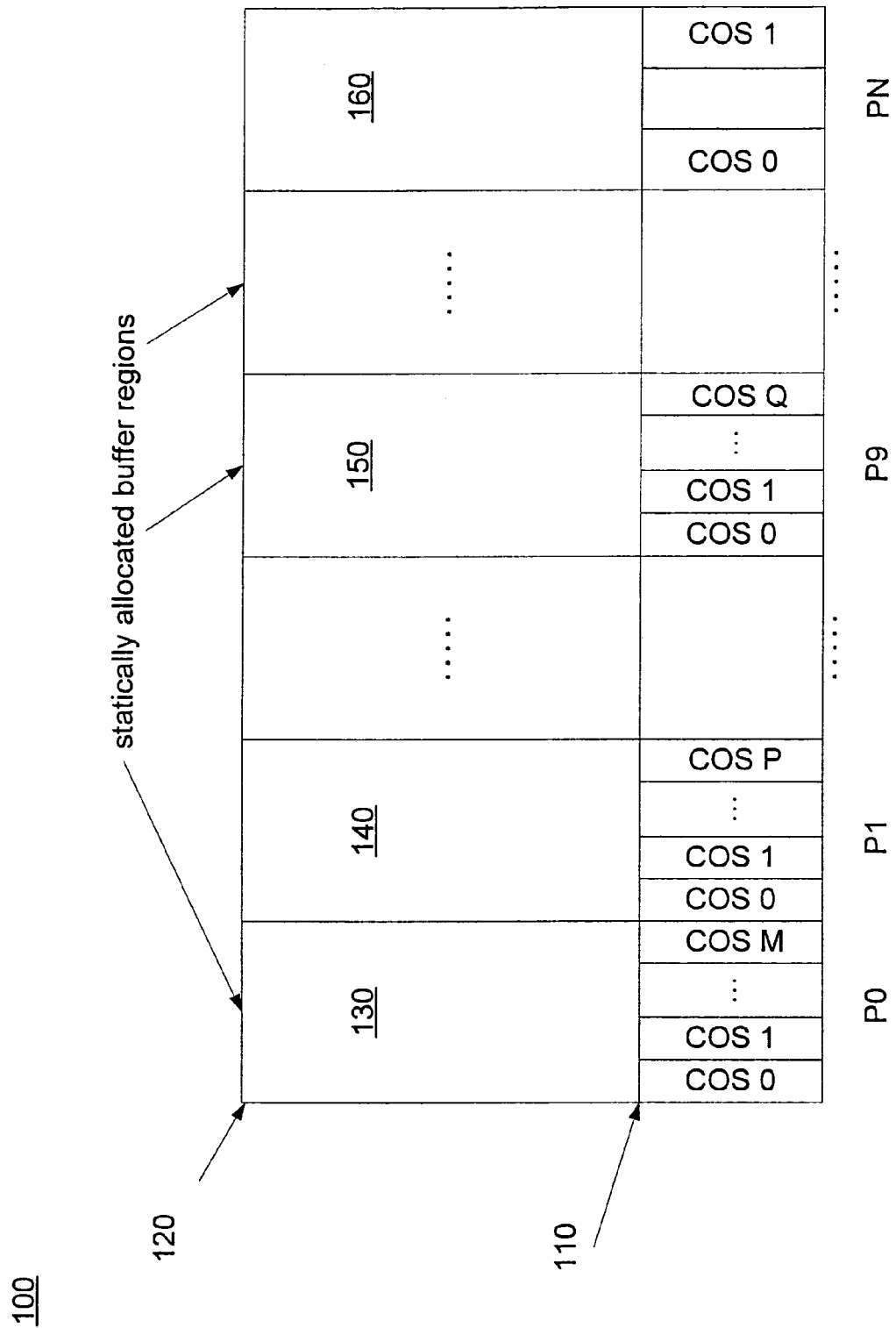
FIG. 1 illustrates a first cell pool buffer according to the related art wherein a statically-allocated buffer region is assigned to each port.
Figure 2:
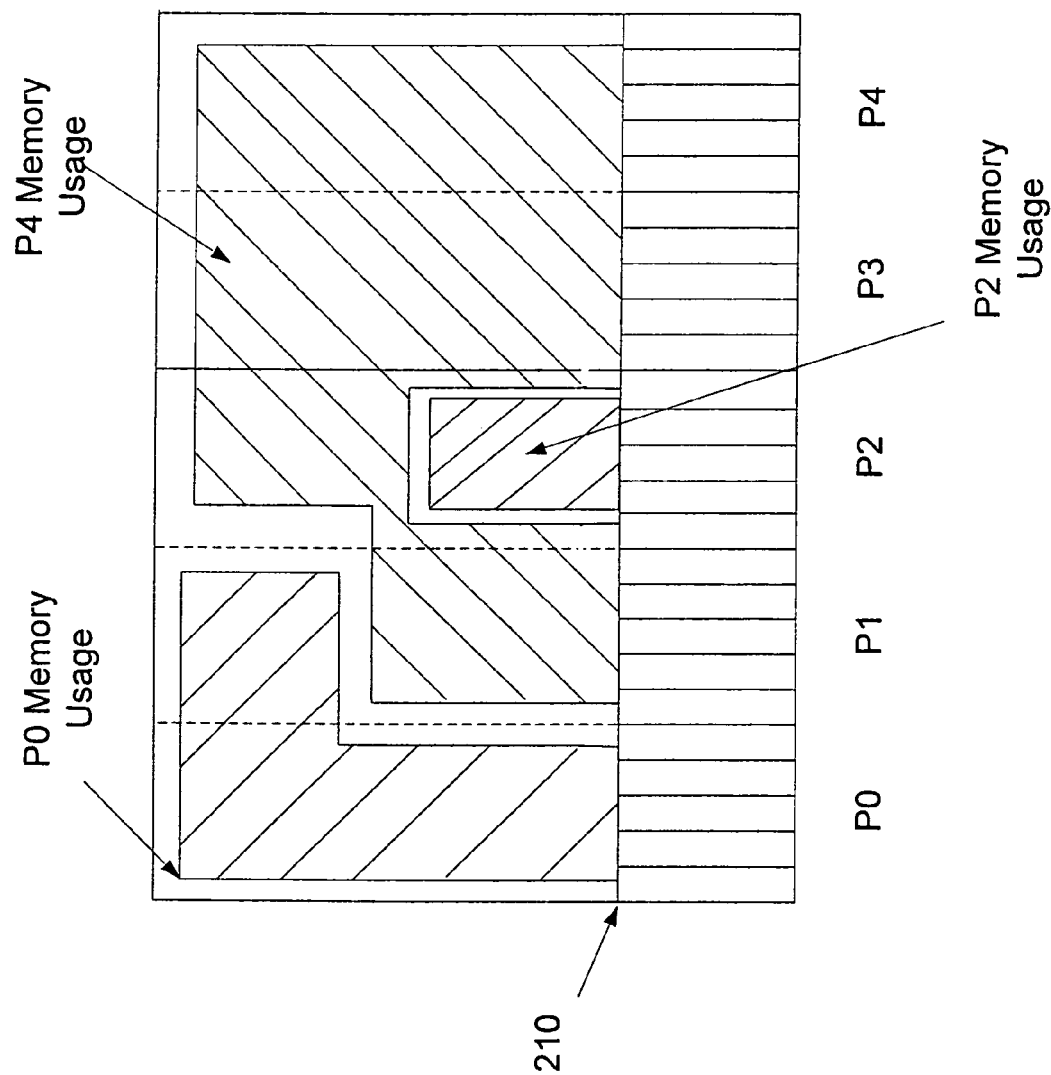
FIG. 2 illustrates a second cell pool buffer according to the related art wherein each of the ports may use any available portion of the buffer above a low-water mark (LWM)
Figure 3A:
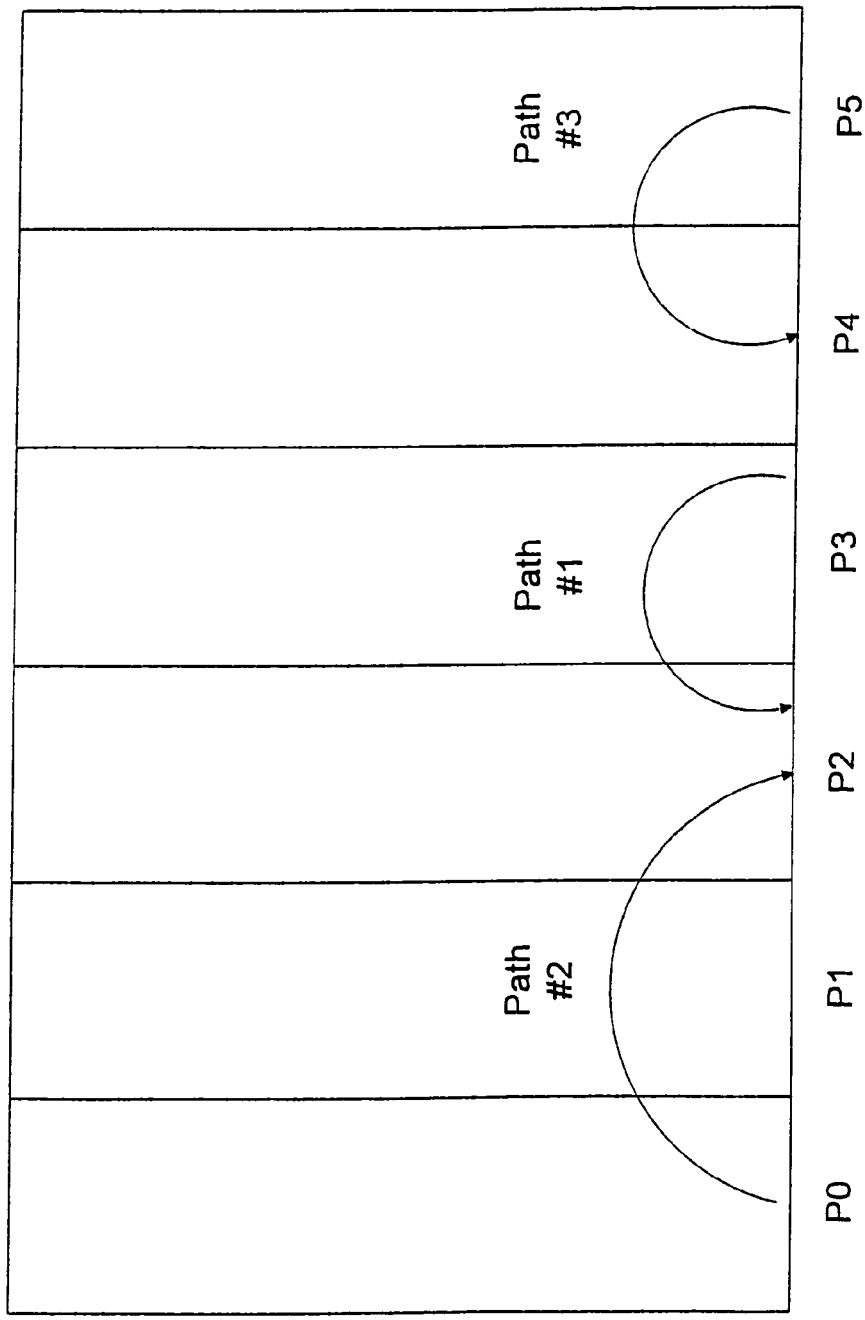
FIG. 3A illustrates communication between ports of a single data distribution device.

Although ingresses into a data distribution device, such as a switch, router, repeater, etc., according to certain embodiments of the present invention may receive datagrams from sources outside of the device, FIG. 3A illustrates that Port 3 in a data distribution device can act as a source and transmitting datagrams to (egress port) Port 2 via Path #1. FIG. 3A also illustrates that Port 0 is transmitting datagrams to (egress port) Port 2 via Path #2. Further, FIG. 3A illustrates that a Port 4 is acting as an egress and receiving datagrams from (transmitting port) Port 5 via Path #3. Under such circumstances, especially if Port 2 is unable to distribute incoming datagrams out of Port 2 at a rate that is equal to or above the rate at which datagrams are being received, Port 2 will generally not be able to instantaneously distribute all of the incoming datagrams attempting to use Port 2 as an egress, and may therefore need to store datagrams in the third cell pool buffer 300.

Figure 3B:
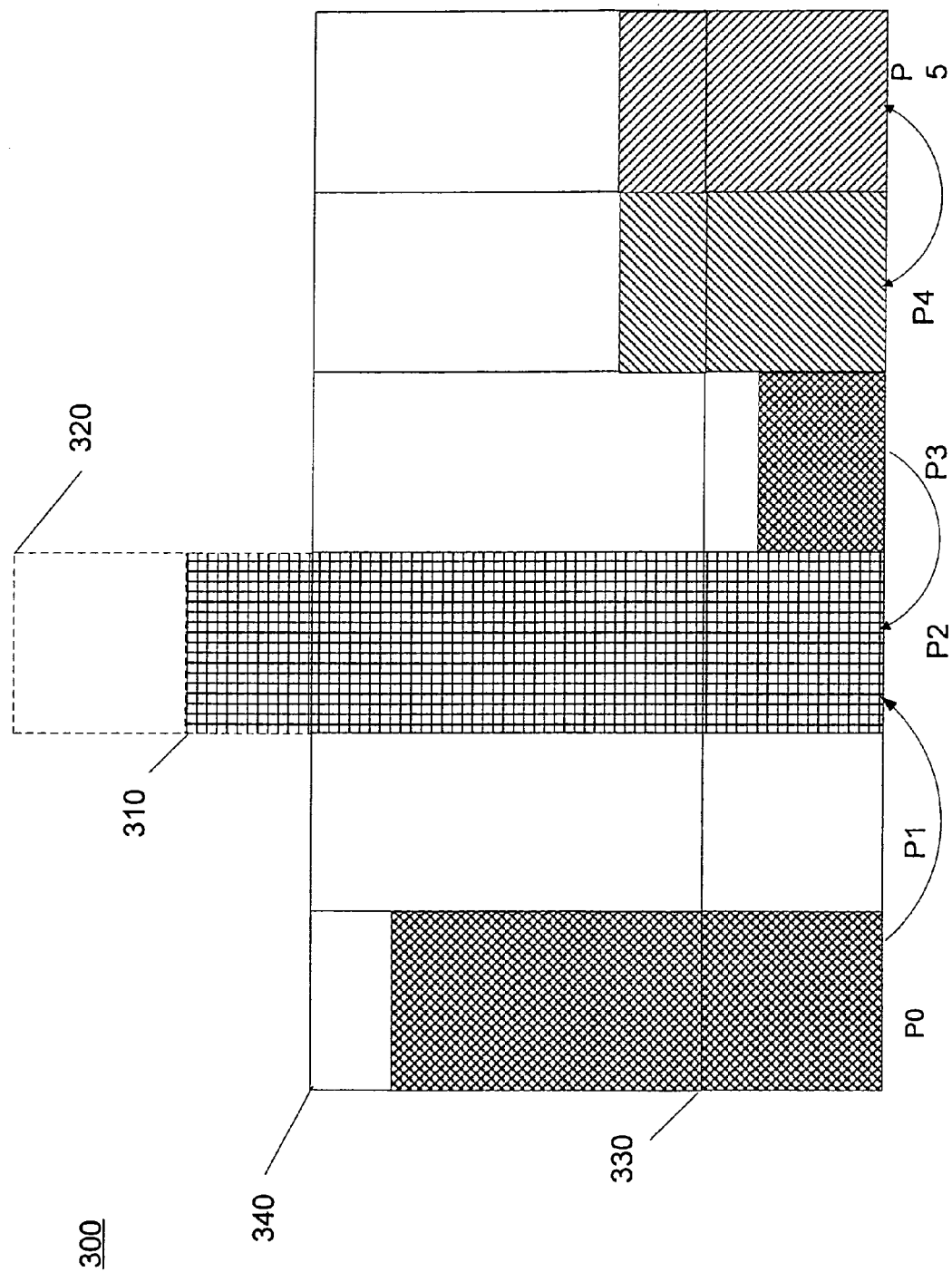
FIG. 3B illustrates a conceptual representation of a memory buffer wherein one port that is operably connected to the memory buffer has stored a number of datagrams in the buffer exceeding a high-water mark (HWM) associated with the port but not exceeding a virtual limit associated with the port.

FIG. 3B illustrates a situation wherein Port 2 has used the third cell pool buffer 300 to store datagrams. As shown in FIG. 3B, Port 2 has stored datagrams in a portion of the third cell pool buffer 300 that exceeds what would have been allocated to Port 2 as a statically-allocated buffer region. However, according to certain embodiments of the present invention, Port 2 is able to use more than what would previously have been statically allocated to it and therefore is capable of filling the overflow region 310 illustrated in FIG. 3B. In fact, according to certain embodiments of the present invention, Port 2 is able to store datagrams up to the virtual limit 320 illustrated in FIG. 3B.

Figure 3C:
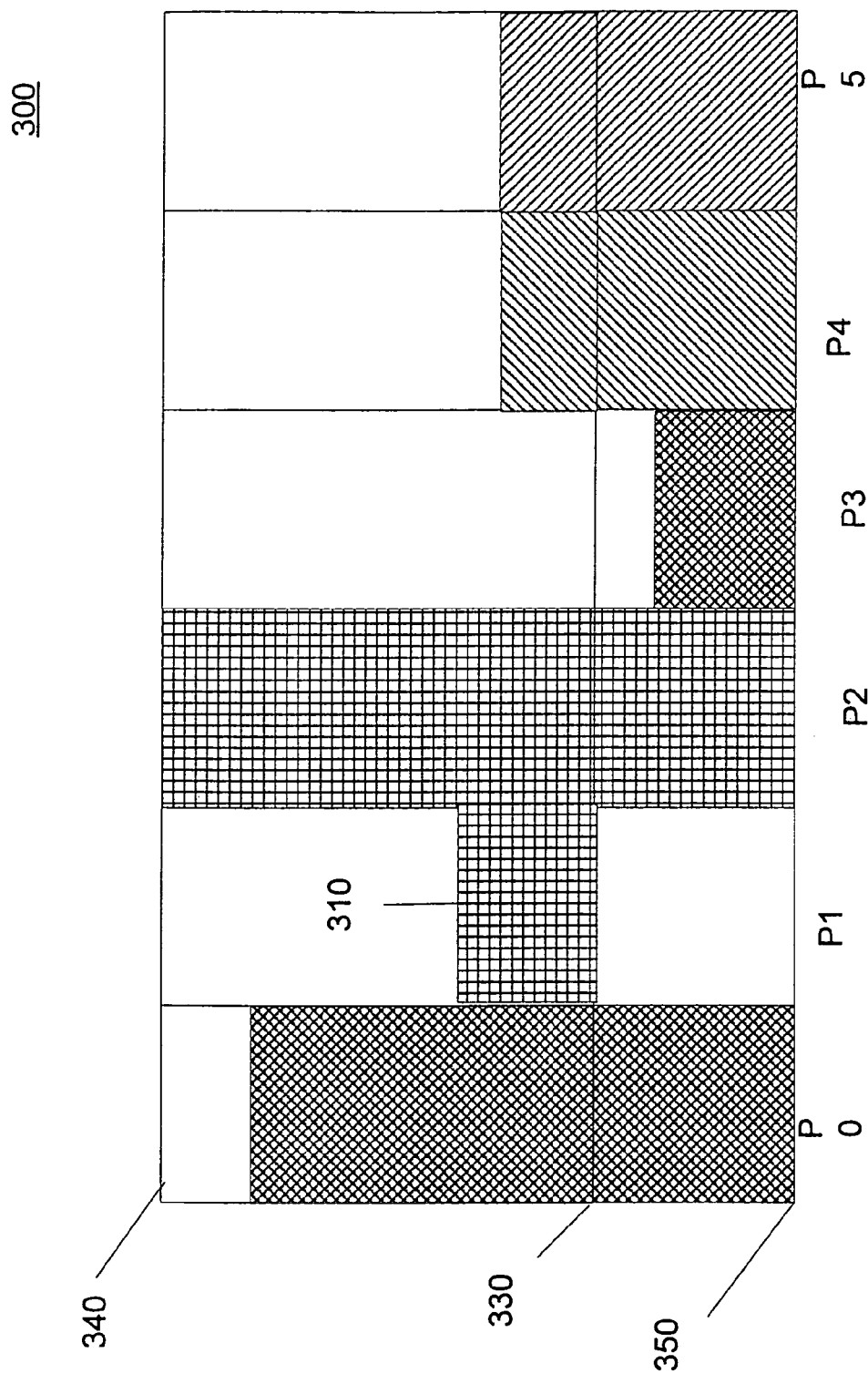
FIG. 3C illustrates the memory buffer illustrated in FIG. 3B after datagrams in an overflow/re-distribution region between the HWM and the virtual limit have been relocated to an available memory region below the HWM.

FIG. 3C illustrates that the datagrams that are represented in the overflow region 310 in FIG. 3B are actually stored in a portion of the memory that would have been statically allocated to Port 1 according to the related art. In other words, the overflow region 310 is able to be stored in the third cell pool buffer 300 because Port 1 was not utilizing all of the memory that was available to it.

As shown in FIGS. 3A-3C, each of the ports illustrated have a portion of the third cell pool buffer 300 that is specifically allocated to it. In FIG. 3C, this allocated region is bounded from below by the zero level 350 and from above by the LWM 330. Between the zero level 350 and the LWM 330, a region that is exclusively dedicated to a single port may be further sub-divided according to the COSs that each port supports.

Figure 3D:
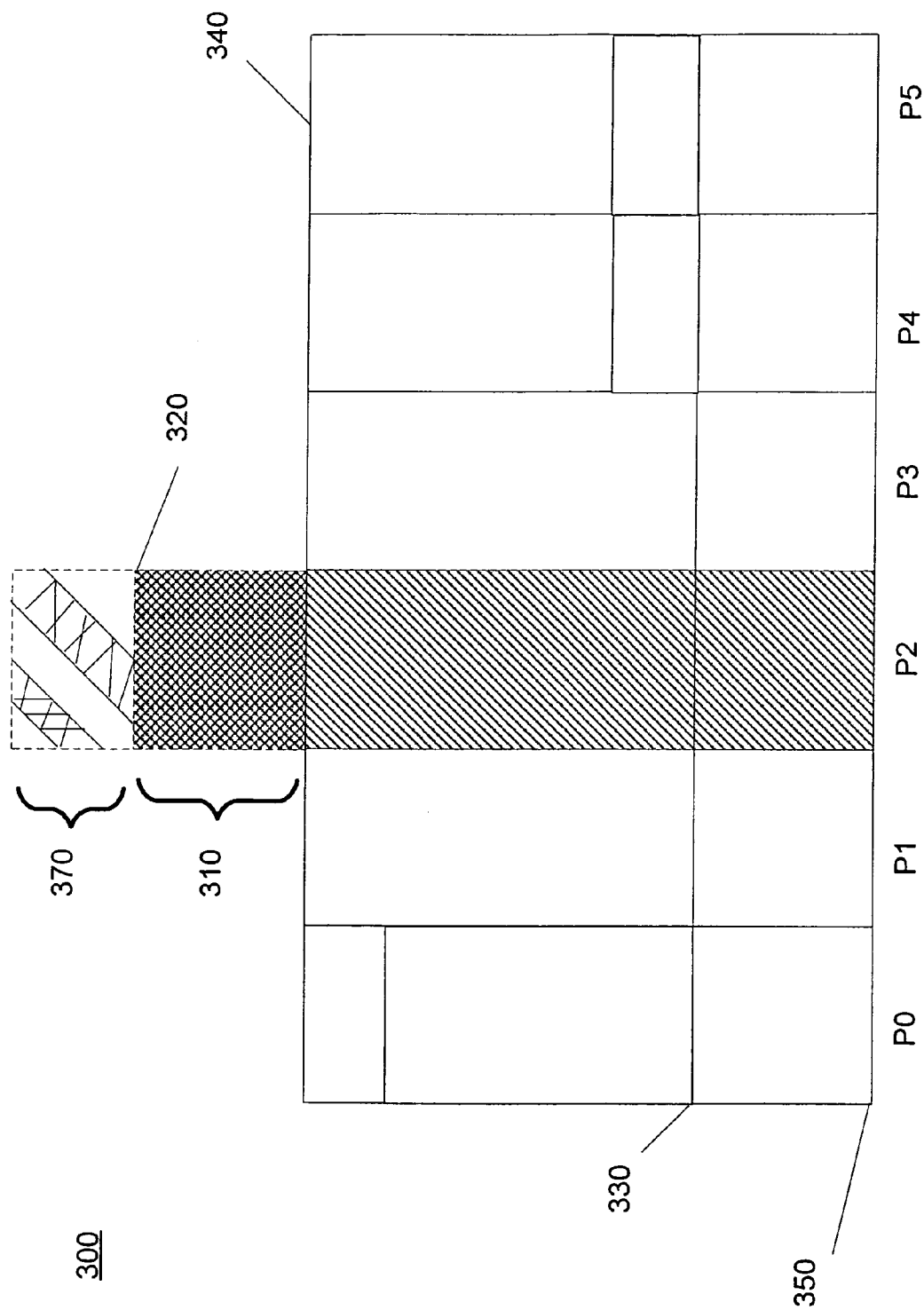
FIG. 3D illustrates a memory buffer wherein datagrams have completely filled an overflow/re-distribution region and wherein datagrams have also reached a conceptual discarded region.

FIG. 3D illustrates a situation wherein the Port 2 has not only exceeded what would have been its statically allocated buffer region in the first cell pool buffer 100, but also has exceeded the virtual limit 320 previously discussed with reference to FIG. 3B. As shown in FIG. 3D, a region between what would have been the high water mark 340 and the virtual limit 320 corresponds to the overflow region which, when additional memory is available in the third cell pool buffer 300, may be redistributed, thereby saving the datagrams therein into the buffer 300. If Port 2 is substantially over-subscribed, datagrams may not fit in either the portion of the third cell pool buffer 300 that is particularly allocated to Port 2 (between the zero level 350 and the low water mark 330), the portion of the third cell pool buffer 300 that would previously have been statically allocated to Port 2 (the region between the low water mark 330 and the high water mark 340), or the region between the high water mark 340 and the virtual limit 320, which is generally redistributed when additional memory is available within the buffer 300. In such situations, datagrams attempting to enter the third cell pool buffer 300, or any other egress-based buffer discussed herein, may conceptually be thought of as entering the discarded region 370, and are typically not stored in the third cell pool buffer 300. In other words, these datagrams are typically discarded or lost.

Figure 4:
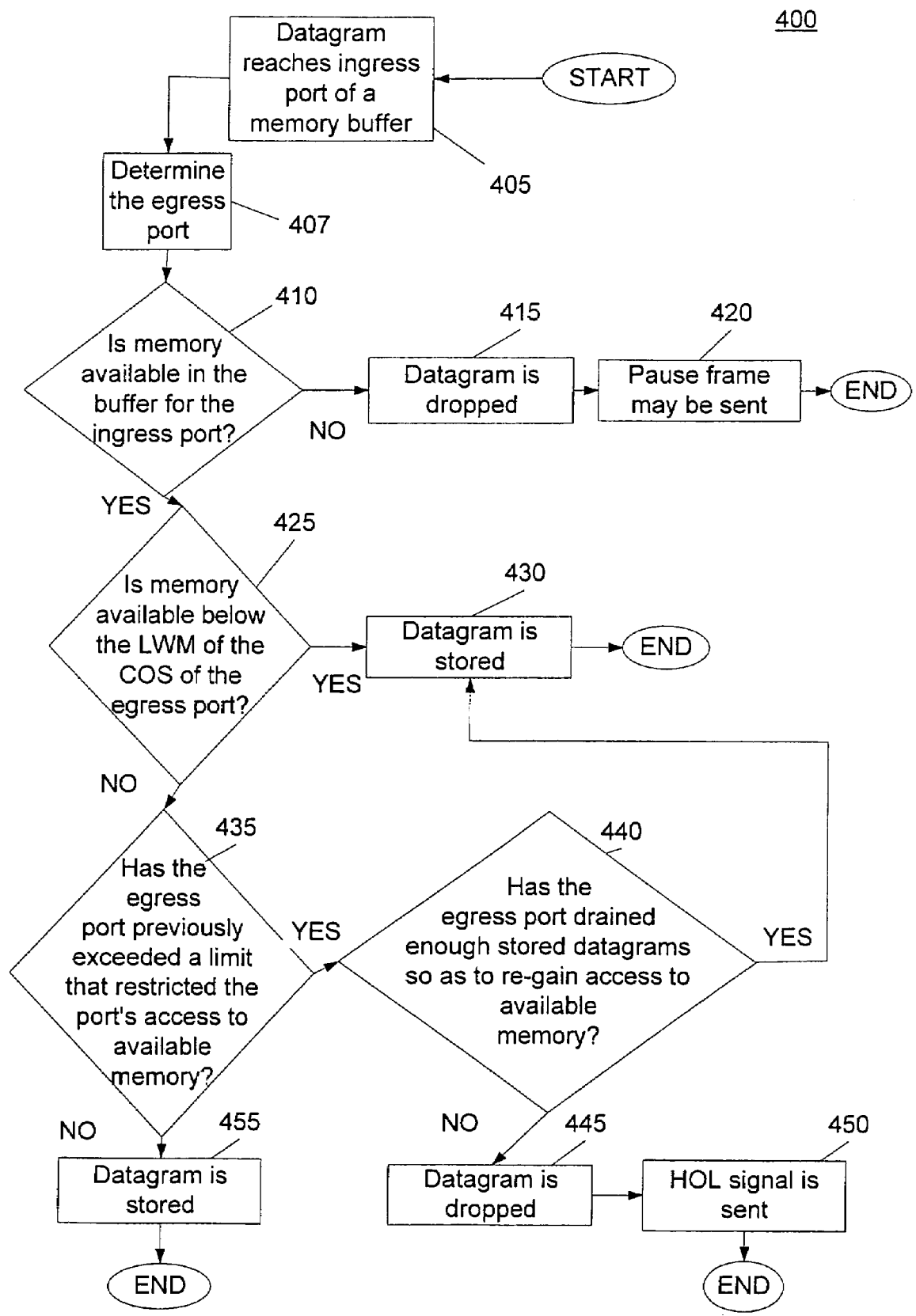
FIG. 4-7, 8A and 8B include flowcharts illustrating the steps of a several algorithms according to certain embodiments of the present invention.

FIG. 4 illustrates a flowchart that contains the steps of a representative first method or algorithm 400 for allocating memory in a memory buffer, such as the third buffer 300 illustrated in FIGS. 3A-3D. As shown in FIG. 4, the first step of the algorithm 405 specifies that a datagram reaches an ingress port of a memory buffer. In the above discussion relating to FIGS. 3A-3D, the ingress ports were Port 0, Port 3, and Port 5 and the datagram could have been, for example, an Internet Protocol (IP) packet.

Second step 407 then recites that an egress port be determined. In the above discussion of FIGS. 3A-3D, Port 2 was the egress port.

The third step 410 of first algorithm 400 illustrated in FIG. 4 is a decision block that provides for different results dependent on whether memory is available anywhere in the buffer that a datagram for the ingress port is attempting to enter. If no memory is available anywhere in the buffer, then according to the fourth step 415, the datagram entering through the egress is dropped, a pause frame may be sent to the network according to the fifth step 420, and algorithm 400 comes to an end.

In FIGS. 3A-3D, the third through fifth steps 410, 415, 420 of algorithm 400 effectively correspond to a decision being made that, at least with respect to Port 2, the entire buffer 300 is full. Once this decision has been made for Port 2, the incoming datagram is only allowed to occupy a portion of the conceptual discarded region 370, where it is effectively dropped/discarded. It should be noted that decisions of whether to drop/discard a datagram is done on a per-port basis for each ingress port.

If it is determined in the third step 410 that there is memory available in the buffer, then algorithm 400 illustrated in FIG. 4 moves on to the sixth step 425, a decision block, wherein it is determined whether memory is available below the LWM allocated to the particular egress port and COS through with the datagram attempts to enter the buffer. In other words, referring to FIGS. 3A-3D, the sixth step 425 determines whether any memory has specifically been allocated between the zero level 350 and the low water mark 330 to the particular egress port and COS supporting the datagram. If memory is available in that region, then, according to the seventh step 430 of algorithm 400, the datagram is stored between the zero level 350 and the LWM 360, and algorithm 400 ends.

If no memory is particularly allocated and available for the egress port and COS supporting to the datagram in question, then, according to the eighth step 435, an inquiry is made as to whether the port through which the datagram is attempting to egress into the buffer has previously exceeded a limited that restricted the port's access to available memory. According to this eighth step 435, between the HWM 340 and the virtual limit 320 illustrated in FIG. 3D, a "trigger level" may be set. According to certain embodiments, this trigger level equals the virtual limit 320. If the trigger level has been previously exceeded by the egress port, then the egress port is typically not allowed to store any more incoming datagrams until, according to the ninth step 440, the egress port has drained enough stored datagrams so as to regain access to available memory in the buffer.

Regaining access to the available memory is typically attained via draining enough datagrams to make the amount of datagrams stored in the buffer drop below a "reset" level. As shown in FIG. 4, if the egress port has sufficiently drained to regain access to available memory in the buffer, then the datagram is stored, according to the seventh step 430 illustrated, and algorithm 400 ends.

However, if the egress port has not drained enough stored datagrams, then, according to the tenth step 445, the datagram is dropped, a head of line (HOL) signal is sent to the network according to the eleventh step 450, and algorithm 400 ends.

It should be noted that, generally, the pause frame that may be sent according to fifth step 420 is typically used to indicate that an ingress limit has been exceeded. In contrast, it should also be noted that the HOL signal sent according to eleventh step 450 is typically used to indicate that an egress and/or COS limit has been exceeded.

Returning to the eighth step 435, if it has been determined that the egress port has not previously exceeded the limit that restricted the port's access to available memory, then the datagram is stored in the buffer according to step the twelfth step 455, and algorithm 400 ends. In FIGS. 3A-3D, this would be represented by a datagram that has attempted to ingress the third cell pool buffer 300 before Port 2 had reached the virtual limit 320, or some other trigger level.

Figure 5:
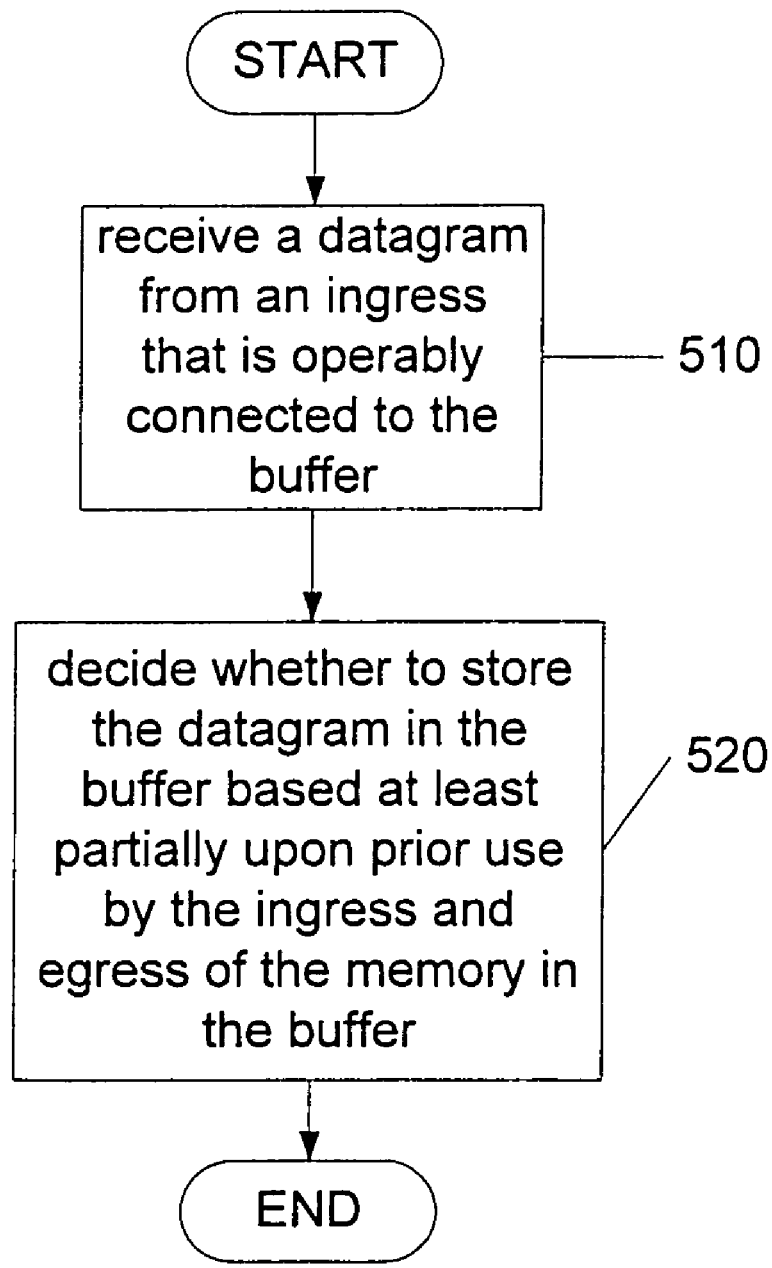

FIG. 5 illustrates a second algorithm 500 that illustrates the steps of a method according to certain embodiments of the present invention for allocating memory in a memory buffer. According to the first step 510 of the second algorithm 500, a datagram is received from an ingress that is operably connected to the memory buffer. Then, according to the second step 520 of the second algorithm 500, a decision is made concerning whether to store the datagram in the buffer. This decision is based at least partially upon prior use by the ingress and egress of memory in the memory buffer.

Figure 6:
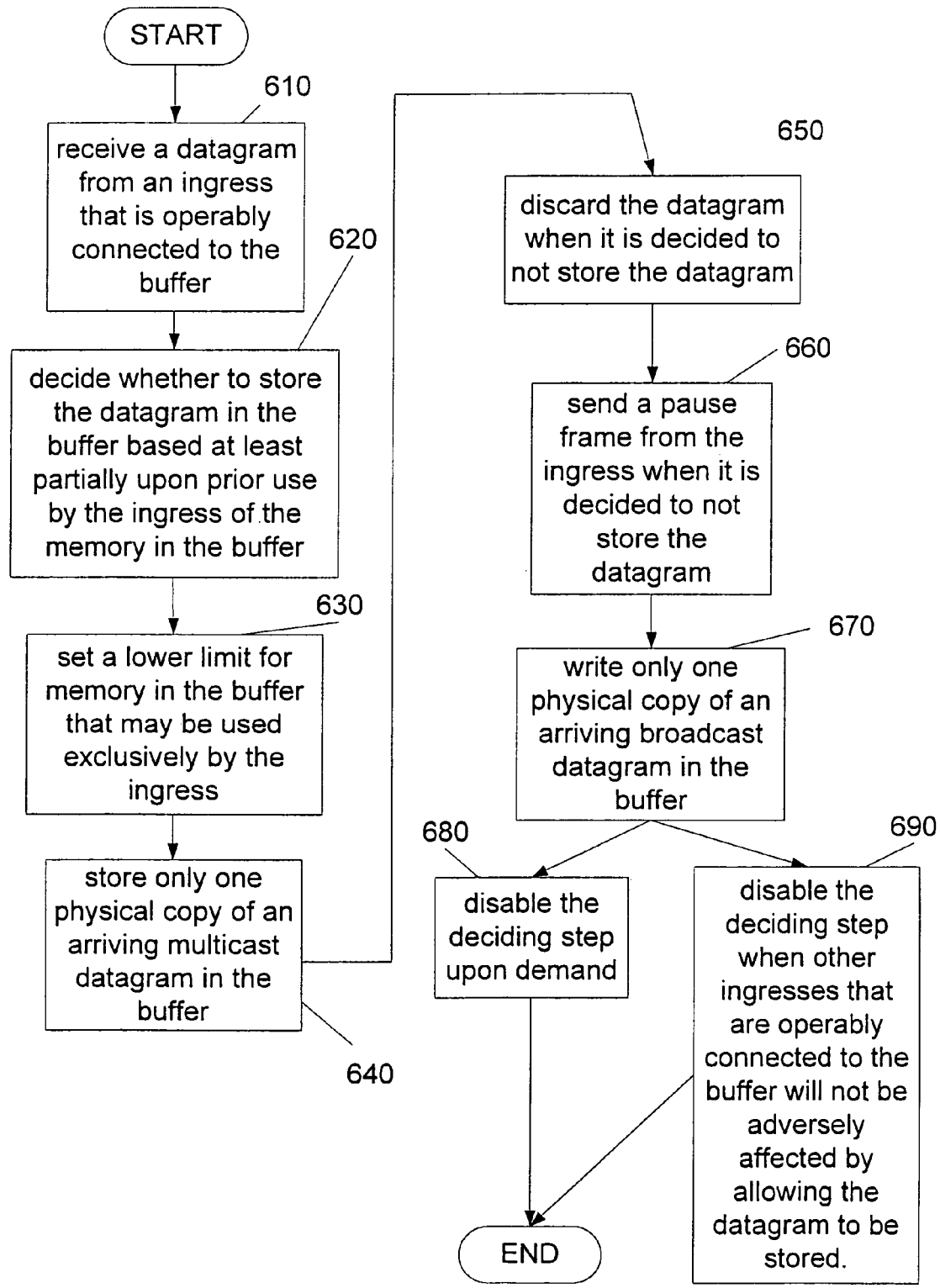

FIG. 6 contains a third algorithm 600 that illustrates the steps of allocating memory in a memory buffer according to certain embodiments of the present invention. As shown in the first step 610 of the third algorithm 600, the datagram is first received from an ingress that is operably connected to the buffer. Then, according to the second step 620, a decision is made as to whether to store the datagram in the buffer. This decision is typically based at least partially upon prior use by the ingress of the memory in the buffer.

The third step 630 specifies that a lower limit be set for memory in the buffer that may be used exclusively by the ingress. Referring to FIGS. 3A-3D, this step may involve setting the LWM 330. Typically, this lower limit would be preset by the programmer. In other words, setting of this lower limit is not part of the flow.

According to the fourth step 640, when a multicast datagram is attempting to enter the cell pool buffer destined to multiple egresses, only one physical copy of the arriving multicast datagram is stored in the buffer. Of course, this one physical copy is only stored if there is data available in the buffer and if no other restrictions are placed on the datagram entering the buffer.

According to the fifth step 650 illustrated in FIG. 6, the datagram gets discarded or dropped when the decision has been made to not store the datagram. When such a situation arises, according to the sixth step 660, a pause frame may then be sent from the ingress port to other devices on the network.

The seventh step 670 illustrated in FIG. 6 specifies that, when a broadcast datagram is attempting to enter the buffer destined to multiple egress ports, only one physical copy of the arriving broadcast datagram is stored in the buffer. Again, this datagram is only stored if memory is available and can be allocated to the storing of that datagram.

The eighth step 680 and ninth step 690 each allow for the second step 620 of the third algorithm 600 to be disabled. According to the eighth step 680, disabling of the second step 620 may be done upon demand. For example, if a user or a remote device, such as a controller, decides that it is no longer beneficial to utilize prior use by an ingress of the memory buffer when deciding whether to allow a datagram into the buffer, then that user, device, or controller may terminate the consideration of that factor. According to the ninth step 690, the disabling of the second step 620 may occur on an automated basis when it has been determined that other ingresses into the buffer will not be adversely affected by allowing a datagram to be stored, regardless of the prior use of the ingress.

Figure 7:
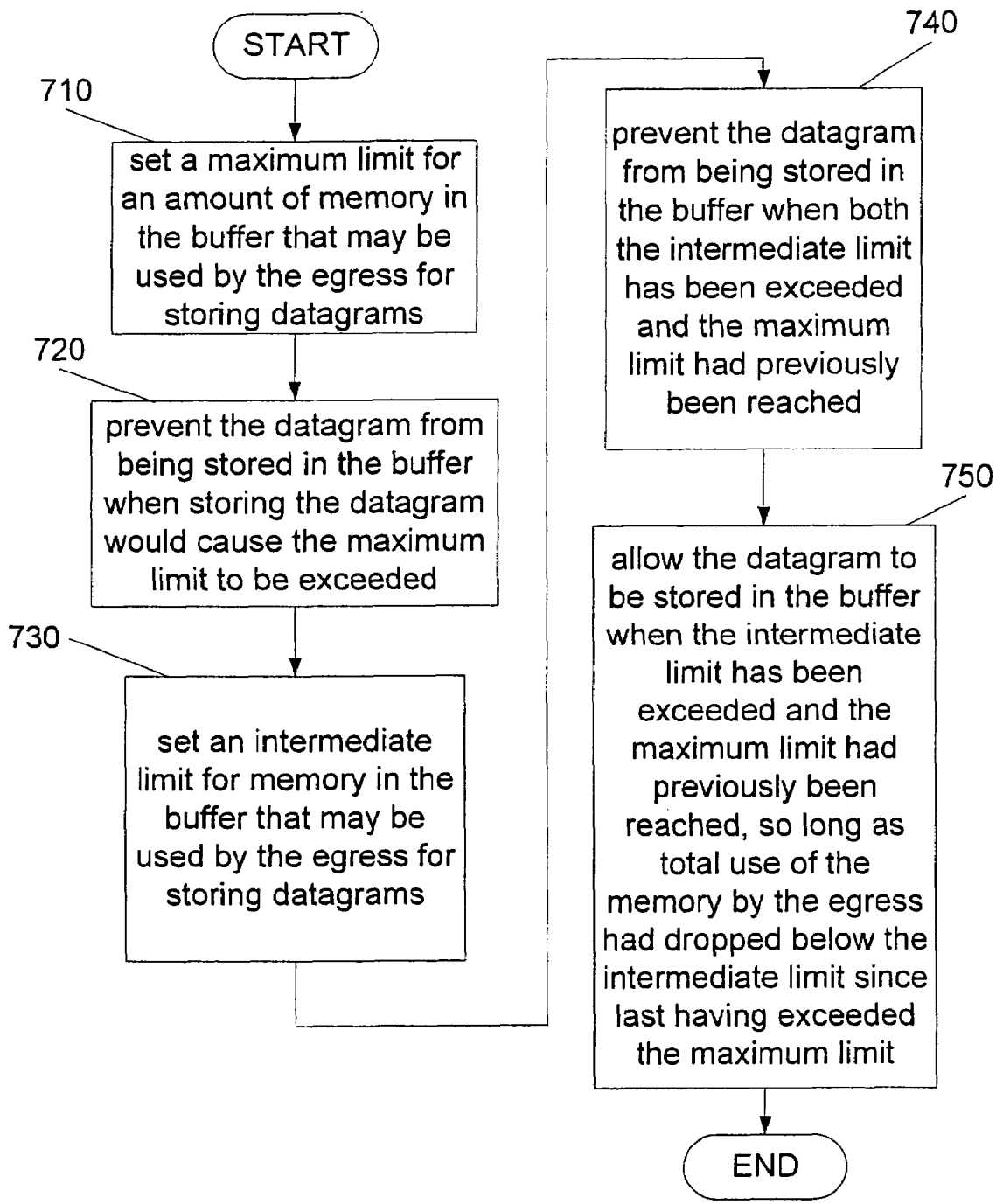

FIG. 7 illustrates additional steps that may be included in the third algorithm 600. The additional steps illustrated in FIG. 7 typically occur during the second step 620 illustrated in FIG. 6. However, according to certain embodiments of the present invention, the additional steps may occur elsewhere.

The first step 710 illustrated in FIG. 7 specifies that a maximum limit may be set for an amount of memory in the buffer that may be used by the egress for storing datagrams. Referring to FIGS. 3A-3D, this step typically correspond to the setting of the virtual limit 320.

According to the second step 720 illustrated in FIG. 7, the datagram may be prevented from being stored in the buffer when storing the datagram would cause the maximum limit to be exceeded. Again, referring to FIGS. 3A-3D, the second step 720 may be thought of as preventing datagrams in the discarded region 370 from entering the buffer.

The third step 730 illustrated in FIG. 7 specifies that an intermediate limit be set for memory in the buffer that may be used by the egress for storing datagrams. Generally, this intermediate limit corresponds to the virtual limit 320.

According to the fourth step 740, the datagram is prevented from being stored in the buffer when both the intermediate limit has been exceeded and the maximum limit had previously been reached. According to this fourth step 740, if an intermediate limit were set below the virtual limit 320, the Port 2 illustrated in FIGS. 3A-3D would be allowed first to store datagrams up to the virtual limit 320, then, would usually not be allowed to store any more datagrams until the total number of datagrams stored in the buffer 300 by the Port 2 dropped below the intermediate limit.

The fifth step 750 illustrated in FIG. 7 allows the datagram to be stored in the buffer when the intermediate limit has been exceeded and the maximum limit had previously been reached, so long as total use by the egress had dropped below the intermediate limit since last having exceeded the maximum limit. According to certain embodiments of the present invention, one distinction between the fifth step 750 and fourth step 740 is that, according to the fifth step 750, once the intermediate limit has been reached, the port may store additional datagrams up to the maximum or virtual limit. On the other hand, according to the fourth step 740, once a total number of datagrams stored in the buffer drops below the intermediate limit, the port is only allowed to store additional datagrams up to the intermediate limit, unless some other release trigger is activated at some other time.

Figure 8A:
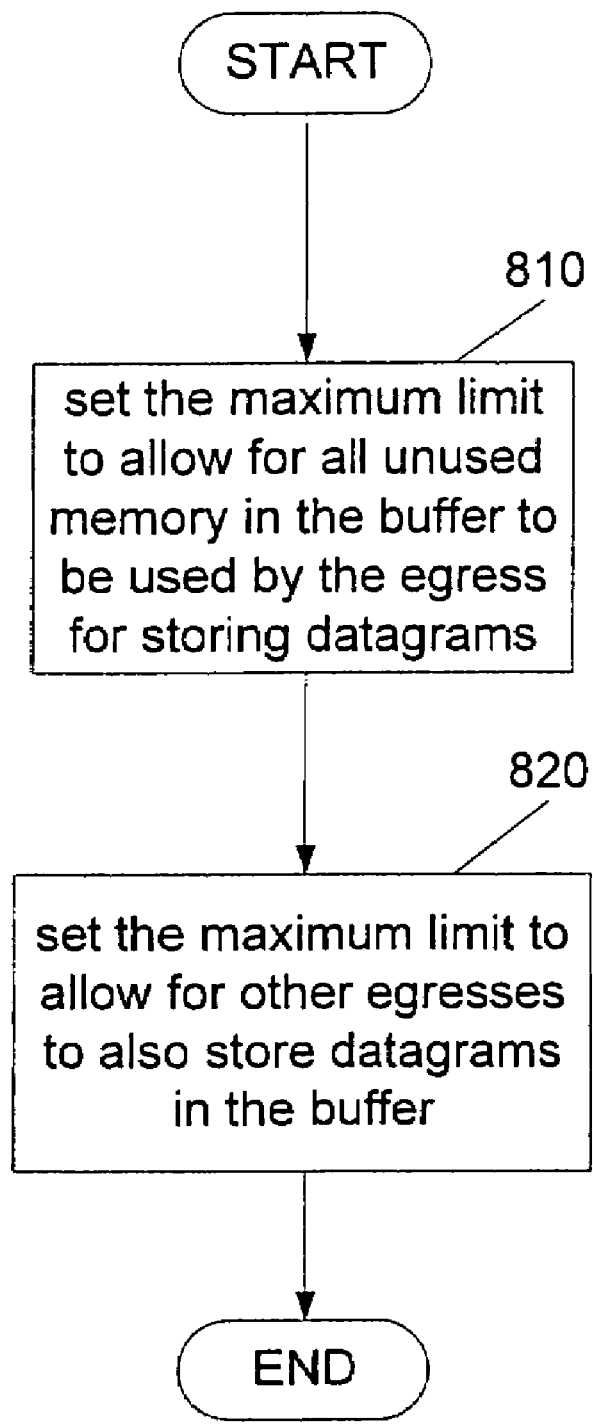
Figure 8B:
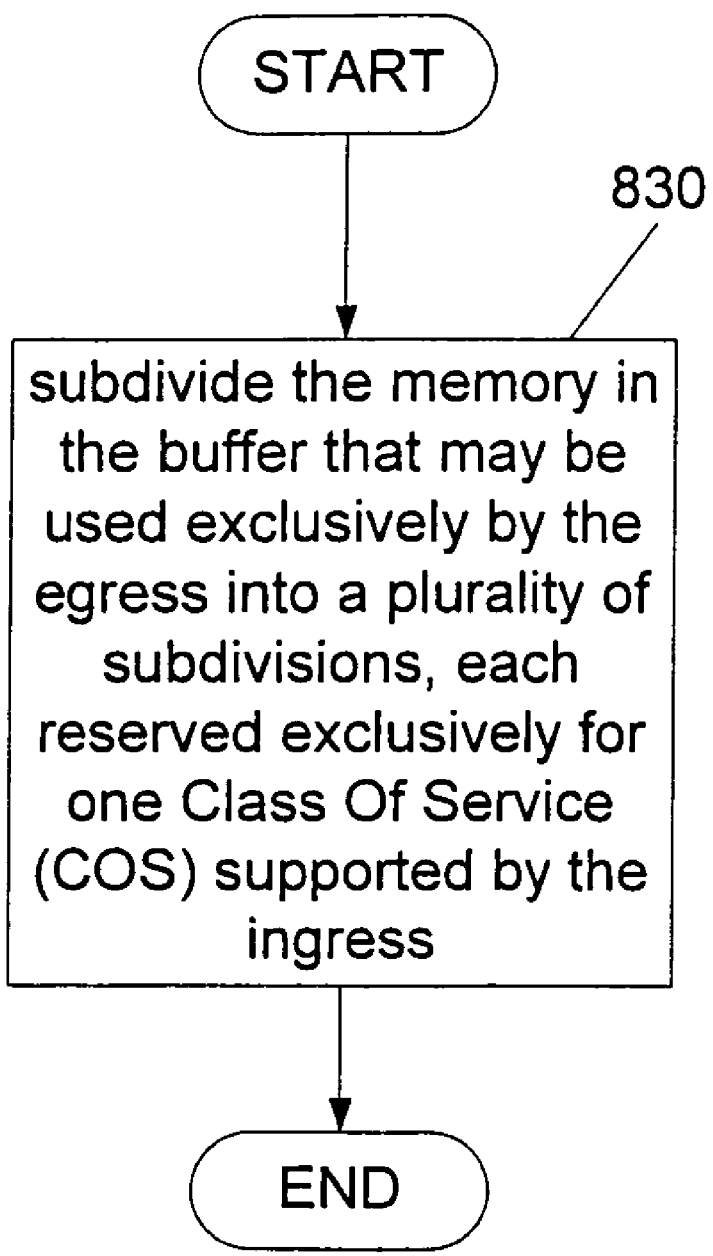

FIGS. 8A and 8B illustrate yet more additional steps that may be included as part of the algorithm 600 illustrated in FIG. 6. According to FIG. 8A, the steps of which generally occur during the first step 710 illustrated in FIG. 7, the first step 810 of FIG. 8A specifies setting the maximum limit to allow for all unused memory in the buffer to be used by the ingress for storing datagrams. In other words, according to this step 810, if any memory is available in the buffer 300, that memory may be used for storing the datagram. Hence, the virtual limit 320 may be set so as to allow for all the memory between the low water mark and high water mark to be used by a single port, so long as no other ports were already making use of any of that memory.

The second step 820 illustrated in FIG. 8 specifies that the maximum limit be set to allow for other egresses to store (or also store) datagrams in the buffer. In other words, according to certain embodiments of the present invention, the virtual limit 320 according to this second step 820 will always leave some space in the buffer for other ports to exceed the low water mark. In other words, one port is not allowed to take up all of the memory available above the low water mark.

The third step 830 illustrated in FIG. 8B, which commonly occurs during the third step 630 illustrated in FIG. 3, specifies that the memory in the buffer that may be used exclusively by the egress be subdivided into a plurality of subdivisions. This step 830 also specifies that each of these subdivisions be reserved exclusively for one COS supported by the egress. In other words, referring again to FIGS. 3A-3D, according to this third step 830, below the LWM, each COS supported by the respective ports may have a minimum allocated amount of memory in the buffer for its exclusive use.

Figure 9:
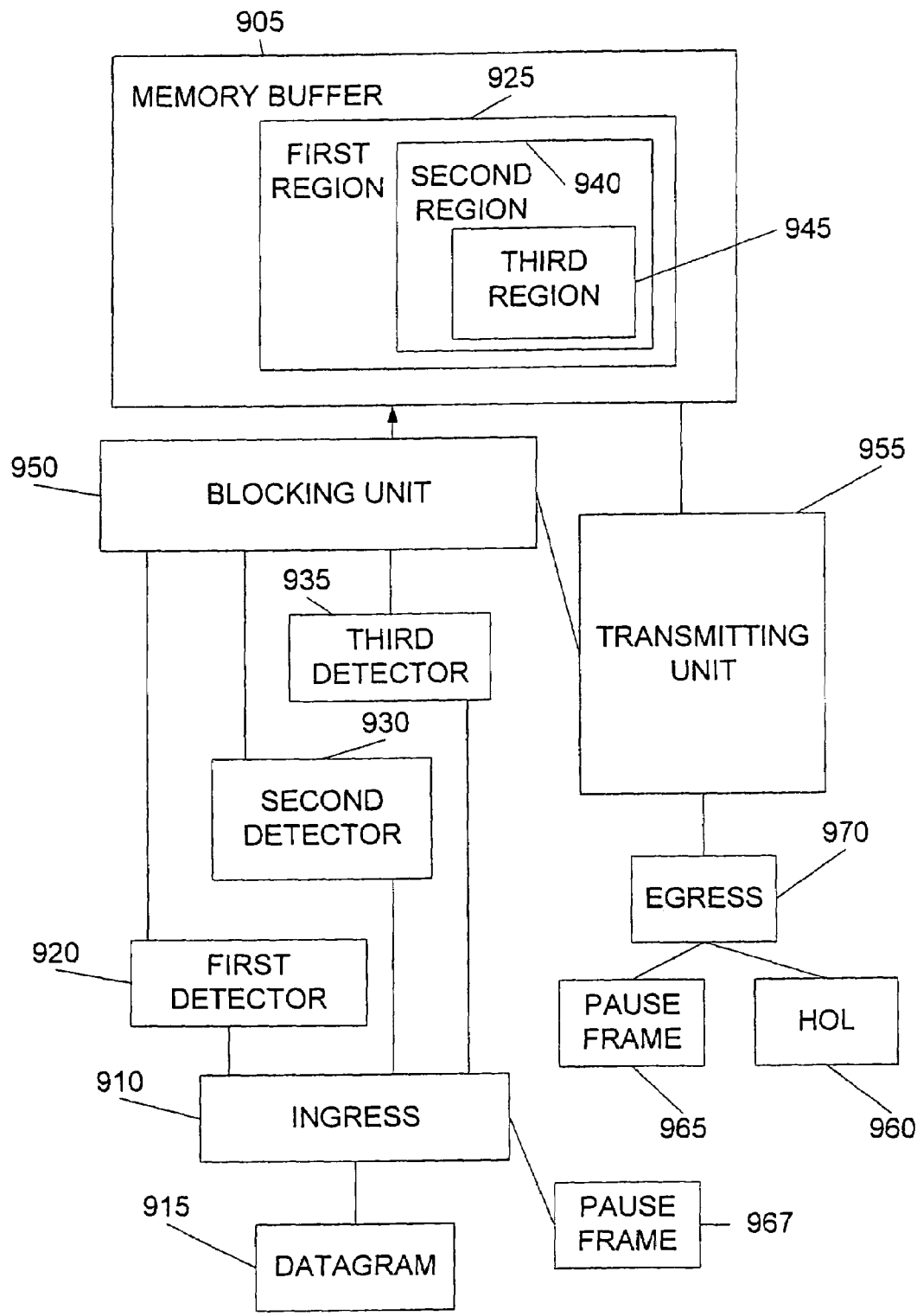
FIG. 9 illustrates a conceptual illustration of a representative system for storing datagrams according to certain embodiments of the present invention.

FIG. 9 illustrates a system 900 that may be used for carrying out one or more of the above-described methods according to the certain embodiments of the present invention. The system 900 includes a memory buffer 905, an ingress 910 that is operably connected to the buffer and configured to store datagrams 915 in the buffer 905. The system further includes a first detector 920 for detecting whether any memory is available to store a datagram in a first region 925 of the buffer. Generally, the first region includes a boundary that is dynamically set based on prior use of the buffer by the ingress 910 and the first detector 920 is operably connected to the buffer 905.

The system 900 also includes a second detector 930, which is typically used for detecting whether memory is available anywhere in the buffer 905 for storing the datagram 915. According to certain embodiments of the present invention, the second detector 930 is also operably connected to the buffer 905.

The third detector 935 illustrated in FIG. 9 is generally used for detecting whether memory is available in a second region 940 of the memory buffer 905 to store a datagram 915. According to certain embodiments of the present invention, the second region 940 may be reserved exclusively for use by either the ingress 910 or the egress 970. According to certain other embodiments, the third detector 935 is also operably connected to the memory buffer 905.

According to yet other embodiments of the present invention, the third detector 935 is configured to detect whether memory is available to store the datagram 915 in a third region 945 of the memory buffer. The third region 945 is typically included in the second region 940 and is also generally reserved exclusively for use by a COS that is supported by the egress 970 and that includes a datagram 915.

In addition to the above, a blocking unit 950 may be included in the system 900. The blocking unit 950 is typically operably connected to the buffer 905 and is often configured to detect whether the ingress has previously reached the boundary. Commonly, the blocking unit 950 prevents the datagram 915 from entering the buffer 905 when the blocking unit 950 detects that the boundary has previously been reached.

The blocking unit 950 may also be configured to allow the datagram 915 to enter the buffer 905 when the blocking unit 950 detects that the boundary has previously been reached. However, this usually only occurs if the blocking unit 950 also detects that a trigger has been reset since the last reaching of the boundary.

According to certain embodiments of the present invention, a transmitting unit 955 is also included in the system 900. Such a transmitting unit 955 generally is operably connected to the first detector and is typically configured to send out at least one of an HOL blocking message 960 and/or a pause frame 965 to a network when the datagram 915 is determined to be non-storable in the buffer 905. The HOL message 960 or frame 965 is typically sent out through an egress 970 that is also commonly operably connected to the memory buffer 905. However, a pause frame 967 may also be sent out by ingress 910.

One having ordinary skill in the art will readily understand that the methods and systems discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of allocating memory in a data buffer, the method comprising the steps of:
   receiving a datagram from an ingress that is operably connected to a buffer;
   setting a minimum level of cells for an egress for each class of service supported by the ingress of the memory in the buffer;
   deciding whether to store the datagram in the buffer based at least partially upon prior use by at least one of the ingress and the egress of the memory in the buffer; and
   storing the datagram in the buffer when the memory is below the minimum level of cells of the egress and the class of service associated with the datagram and supported by the ingress.

2. The method of claim 1, wherein the deciding step comprises:
   setting a maximum limit for an amount of memory in the buffer that may be used by the ingress for storing datagrams; and
   preventing the datagram from being stored in the buffer when storing the datagram would cause the maximum limit to be exceeded.

3. The method of claim 2, wherein the setting the maximum limit step comprises setting the maximum limit to allow for all unused memory in the buffer to be used by the ingress for storing datagrams.

4. The method of claim 2, wherein the setting the maximum limit step comprises setting the maximum limit to allow for other ingresses to store datagrams in the buffer.

5. The method of claim 2, wherein the deciding step comprises:
   setting an intermediate limit for memory in the buffer that may be used by the ingress for storing datagrams; and
   preventing the datagram from being stored in the buffer when both the intermediate limit has been exceeded and the maximum limit had previously been reached.

6. The method of claim 5, wherein the deciding step further comprises:
   allowing the datagram to be stored in the buffer when the intermediate limit has been exceeded and the maximum limit had previously been reached, so long as total use of the memory by the ingress had dropped below the intermediate limit since last having exceeded the maximum limit.

7. The method of claim 1, further comprising the step of:
   setting a lower limit for memory in the buffer that may be used exclusively by the ingress.

8. The method of claim 7, wherein the setting a lower limit step comprises subdividing the memory in the buffer that may be used exclusively by the ingress into a plurality of subdivisions, each reserved exclusively for one Class Of Service (COS) supported by the ingress.

9. The method of claim 1, further comprising the step of:
   storing only one physical copy of an arriving multicast datagram in the buffer.

10. The method of claim 1, further comprising the step of: discarding the datagram when it is decided to not store the datagram.

11. The method of claim 1, further comprising the step of: sending a pause frame from the ingress when it is decided to not store the datagram.

12. The method of claim 1, further comprising the step of: writing only one physical copy of an arriving broadcast datagram in the buffer.

13. The method of claim 1, further comprising the step of: disabling the deciding step upon demand.

14. The method of claim 1, further comprising the step of: disabling the deciding step when other ingresses that are operably connected to the buffer will not be adversely affected by allowing the datagram to be stored.

15. A system for storing datagrams, the system comprising:
a memory buffer;
an ingress that is operably connected to the buffer and configured to store datagrams in the memory buffer;
a first detector for detecting whether any memory is available to store a datagram in a first region of the memory buffer; and
a storing unit for storing the datagram in the buffer when the memory is below a minimum level of cells of an egress and a class of service associated with the datagram and supported by the ingress, wherein the first region includes a boundary that is dynamically set based on prior use of the buffer by the ingress and wherein the first detector is operably connected to the buffer.

16. The system of claim 15, further comprising:
a second detector for detecting whether memory is available anywhere in the buffer for storing the datagram, wherein the second detector is operably connected to the buffer.

17. The system of claim 15, further comprising:
a third detector for detecting whether memory is available in a second region of the memory buffer to store the datagram, wherein the second region is reserved exclusively for use by the ingress, and wherein the third detector is operably connected to the buffer.

18. The system of claim 17, wherein the third detector is configured to detect whether memory is available to store the datagram in a third region of the memory buffer, wherein the third region is included in the second region and wherein the third region is reserved exclusively for use by a COS that is supported by the ingress and that includes the datagram.

19. The system of claim 15, further comprising:
a blocking unit operably connected to the buffer and configured to detect whether the ingress has previously reached the boundary and to prevent the datagram from entering the buffer when the blocking unit detects that the boundary has previously been reached.

20. The system of claim 19, wherein the blocking unit is also configured to allow the datagram to enter the buffer when the blocking unit detects that the boundary has previously been reached if the blocking unit also detects that a trigger has been reset since the last reaching of the boundary.

21. The system of claim 15, further comprising a transmitting unit that is operably connected to the first detector and configured to send out an HOL blocking message from the egress when the datagram is determined to be non-storable in the buffer.

22. The system of claim 15, further comprising a transmitting unit that is operably connected to the first detector and configured to send out a pause frame to the ingress when the datagram is determined to be non-storable in the buffer.

* * * * *